(12) United States Patent
Stork

(10) Patent No.: US 6,271,967 B1
(45) Date of Patent: Aug. 7, 2001

(54) OPTICALLY DIFFRACTIVE STRUCTURE

(75) Inventor: Wilhelm Stork, Karlsruhe (DE)

(73) Assignee: Leonard Kurz GmbH & Co., Furth (DE)

( * ) Notice: Subject to any disclaimer, the term of this patent is extended or adjusted under 35 U.S.C. 154(b) by 0 days.

(21) Appl. No.: 08/952,363

(22) PCT Filed: Apr. 24, 1996

(86) PCT No.: PCT/DE96/00747

§ 371 Date: Dec. 3, 1997

§ 102(e) Date: Dec. 3, 1997

(87) PCT Pub. No.: WO96/35191

PCT Pub. Date: Nov. 7, 1996

(30) Foreign Application Priority Data

May 6, 1995 (DE) .............................................. 195 16 741

(51) Int. Cl.[7] .............................. G02B 5/18; B42D 209/00
(52) U.S. Cl. ........................ 359/567; 359/569; 359/575; 359/2; 283/85; 283/86
(58) Field of Search ................... 359/2, 567, 575, 359/566, 569; 283/85, 86

(56) References Cited

U.S. PATENT DOCUMENTS

| | | | |
|---|---|---|---|
| 4,400,057 | * | 8/1983 | Moraw et al. .................. 359/575 |
| 4,832,445 | * | 5/1989 | Haines et al. ..................... 359/2 |

FOREIGN PATENT DOCUMENTS

| | | | | |
|---|---|---|---|---|
| 0075674 A2 | * | 4/1983 | (EP) | ............................ G07D/7/00 |
| 0247471 A2 | * | 12/1987 | (EP) | ............................ G02B/27/44 |
| 0360969 A1 | * | 4/1990 | (EP) | ............................ G06K/19/08 |
| 2093404 | * | 2/1982 | (GB) | ............................ B42D/15/00 |
| JP 6-118864 A | * | 4/1994 | (JP) . | |

* cited by examiner

*Primary Examiner*—Cassandra Spyrou
*Assistant Examiner*—John Juba, Jr.
(74) *Attorney, Agent, or Firm*—Hoffmann & Baron, LLP

(57) ABSTRACT

The invention concerns a structure arrangement that includes surface regions having one or more structures having an optical-diffraction effect, in particular for visually identifiable, optical security elements for value-bearing documents, for example banknotes, credit cards, passes or check documents, or other items to be safeguarded; in order to make it more difficult to forge and in particular copy such a structure arrangement it is proposed in accordance with the invention that the structure arrangement is such that for the production of given items of optical information in given viewing directions in one or more of the surface regions (8, 30) of the structure arrangement there are provided sub-regions (10, 12, 14, 32, 34) with a structure (16, 18, 20; 36, 38) that is identical except for the structural parameter of optical depth and that the optical depth of the structure (16, 20; 36) is constant over the extent of a sub-region (10, 14; 32) but is different from the optical depth of the structure (18; 38) of another sub-region (12; 34).

17 Claims, 1 Drawing Sheet

OPTICALLY DIFFRACTIVE STRUCTURE

BACKGROUND OF THE INVENTION

1. Field of the Invention

The invention concerns a structure arrangement comprising surface regions having one or more structures with an optical-diffraction effect, in particular for visually identifiable, optical security elements for value-bearing documents, for example banknotes, credit cards, passes or check documents, or other items to be safeguarded.

2. Description of the Prior Art

When using a structure arrangement of that kind visually perceptible items of information can be communicated to a viewer by diffraction and/or refraction of incident ambient light. It is however also possible to envisage detection of optical items of information of that kind by machine, using suitable items of equipment. In the simplest case a structure arrangement of that kind is afforded by an in particular rectilinear wave-shaped relief structure which is provided on the surface of a surface region of a carrier element and at which incident ambient light is reflected with diffraction and/or refraction. In this respect the term wave or relief structure does not necessarily denote a structure with a surface line which is steady in terms of the cross-section of the surface region and which in particular is sinusoidal, but this may also involve rectangular, step-shaped or wedge-shaped surface structures. Those surface structures can be of a periodic or aperiodic configuration. It is also conceivable that the structures having an optical-diffraction effect are not formed exclusively by relief structures, but that there are provided variations in the refractive index in structured form.

Diffraction of incident light or light which passes through the structure arrangement, at the structures of the surface regions, and therewith the information which is emitted therefrom in the form of an optical diffraction image are determined by the grating or structure parameters. In the case of relief structures reference is to be made here to the number of wave or grating lines per unit of length of a surface region, the so-called spatial frequency, as well as the orientation and the cross-sectional shape of the relief structure. The cross-sectional shape is determined inter alia by the differences in respect of height in the relief structure, more specifically both by the differences in respect of height between the individual raised portions relative to each other, and also between raised portions and troughs or depressions of the relief structure. In the case of structures which are not formed by relief structures but by variations in refractive index which are arranged in a structured manner, the structure parameters are defined in accordance with the foregoing, while in addition the refractive indices of the optically effective layer or layers are to be taken into account. By virtue of a suitable configuration and arrangement of the structures, it is possible to obtain a structure arrangement which influences the phase relationships of the incident light in such a way that a given item of optical information can be emitted in a given viewing angle range and thus perceived by a viewer while in another viewing angle range another item of information can be emitted. A variation in the phase relationship by virtue of the structure arrangement results from the product of the refractive index and the geometrical wavelength within or at the structure arrangement. The optical phase difference (OPD) in the case of a wave which is diffracted or reflected at a location $x_1$ (for example a raised portion of the structure) and at a location $x_2$ (for example a depression of the structure) would be:

$$OPD(x_1, x_2) = \int n(x_1, z)dz - \int n(x_2, z)dz.$$

It also follows from that relationship that it makes a difference whether a reflection relief grating is covered with a lacquer, as is current practice, or not, as it is not just the difference in respect of height alone but also the refractive index of the cover layer, that is relevant. An item of visually perceptible information which corresponds to the structures of the surface regions and which is dependent inter alia on the lighting or viewing angle, in particular information in regard to authenticity of the safeguarded item, can therefore be communicated to a viewer in the form of the reflected light or the light which passes through the structure.

By virtue of the use of per se known security elements with a structure arrangement having an optical-diffraction effect, in regard to the articles to be safeguarded as were referred to in the opening part of this specification, it is possible for items of authenticity information in respect of the safeguarded article to be rendered visible even to the unpracticed lay person. At the same time it is possible for forgery, for example in the form of duplication, having regard to known forgery procedures, in particular optical duplication procedures, to be rendered impossible or made sufficiently difficult.

Structure arrangements for example are known in which, by virtue of a specific variation in the above-mentioned structure parameters—spatial frequency, orientation and cross-sectional shape of a relief structure, differences in respect of height or phase in the relief structure—a given item of visually perceptible optical information which originates from one surface region can be communicated to a viewer in dependence on the lighting direction, in a given viewing angle range, while no or another item of optical information can be perceived in the same viewing angle range, originating from another surface region of the structure arrangement. Pivotal movement of the carrier element which carries the structure arrangement, about an axis which is in the plane of the carrier element or about an axis which extends perpendicularly to the plane of the carrier element, causes a change in the information which originates from the surface region which is first viewed—in particular that surface region can appear dark—while another surface region which initially appeared dark imparts optical information, for example in the form of a color impression.

SUMMARY OF THE INVENTION

The object of the present invention is to make it more difficult to forge and in particular copy a structure arrangement of the above-described kind, and in particular to increase the multiplicity of encoding options for the optical information which can be perceived within a viewing angle range.

In accordance with the invention that object is attained in that for the production of given items of optical information in given viewing directions in one or more of the surface regions of the structure arrangement there are provided sub-regions with a structure that is identical except for the structural parameter of optical depth and that the optical depth of the structure is constant over the extent of a sub-region but is different from the optical depth of the structure of another sub-region.

In the case of pure relief structures the optical depth is determined by the geometrical depth thereof; it corresponds to the optical wavelength difference between two beams which are reflected at raised portions or depressions respectively of the relief structures. In the case of structures with local variations in refractive index, the optical depth which is responsible for the phase relationships of the light which is diffracted at the structure is given by the different refractive indices and additionally by different thicknesses of the coating. The optical depth of a structure determines inter alia the amount of light which is diffracted away from the geometrical reflection direction, that is to say the diffraction efficiency of that structure. Two structures which are identical except for the parameter of optical depth thus communicate items of optical information which differ from each other, in a given viewing direction. The association according to the invention of a structure of a given first optical depth with an item of wave-optical information which is wanted within a given viewing angle range, in conjunction with the association of at least one further structure of a second or further optical depth with another wanted item of information provides a further control or encoding option in regard to an image impression to be communicated, in relation to a structure arrangement. If for example there are provided sub-regions with a structure that is identical except for their optical depth and the dimensions of which cannot be resolved with the naked eye, then different items of optical information can be communicated from the same area of the structure arrangement.

Thus, by virtue of an arrangement, corresponding to a desired image impression, of the sub-regions which are of a configuration in accordance with the invention, an image motif or unit which is produced by the structure of a first optical depth can appear in a first color in a first viewing direction while in another viewing direction an image motif or unit which is produced by sub-regions of a structure of a second optical depth can be perceived in another color. In order to achieve such effects, it is found to be advantageous if the optical depth of the respective structure is associated with a given visually perceptible wavelength or a wavelength range. The optical depth of a structure can however also be associated with a wavelength or wavelength range which can be detected by machine means. In general the diffraction efficiency in connection with the conventional rectangular gratings or sinusoidal gratings is at a maximum when the optical depth thereof causes a phase delay of $\pi$. As wave phenomena are periodic, that maximum diffraction efficiency is repeated at a first approximation with those symmetrical grating forms with an optical depth of the phase delay $(2k-1)\cdot\pi$, $k=1, \ldots N$. Geometrically that depth is calculated in the case of reflection gratings of the first order (k=1) by the formula $\delta z=R/4n$ wherein n denotes the refractive index of the cover layer. In the case of sawtooth-shaped echelette gratings the maximum diffraction efficiency is achieved at a depth which corresponds to a phase delay of $2k\pi$. Gratings of a higher order (k>1) have a depth which is k times greater and are therefore more difficult to produce. Optimum controllability however is achieved with an optical depth in respect of the respective structure in the range between 0 and some multiples, preferably up to 10-times the wavelength being considered.

Particularly when a particularly homogeneously appearing image motif or unit is wanted, it is recommended that there are provided groups of sub-regions of identical structure, which can no longer be resolved with the naked eye.

In a further development of the invention of particular significance, there are provided sub-regions of the structure arrangement, involving a structure which is identical except for the parameter of optical depth and which is displaced relative to each other by a fraction of the grating period. In that case the displacement can be implemented by a shift of a structure relative to the other structure in the plane of the carrier. It is however also possible for the structures to be arranged in a direction perpendicularly to the plane of the carrier, so-to-speak at different levels in respect of height. That displacement can be the same as a superimposition of the structure in question with a further structure which has an optical-diffraction effect and the dispersion direction of which can extend in particular transversely to that structure. That affords possible ways of protection from holographic copying procedures. Holograms can usually be simply copied by producing a hologram from the hologram. Primarily argon-ion or HeCd-lasers are used as holography lasers, as those lasers have strong lines in the blue-green (488 nm), in the blue (454, 442 nm) and in the ultra-violet (about 350 nm) frequency range. Most photolacquers which are suitable for holographic surface reliefs are also sensitive in that range; in the red frequency range in contrast such photolacquers are mostly insensitive. Production and copying of holograms can admittedly also be implemented with red lasers (for example HeNe-lasers); at the present time silver-bearing gelatine emulsions (photographic plates) are used for that purpose, but they do not produce a suitable surface relief for galvanic casting or molding. If now the optical depth of the structures is such that the diffraction efficiency for blue light is very low whereas it is very high for red light, the structure can be copied only with difficulty, when using a blue laser. Copying the hologram on to a red-sensitive photoemulsion and subsequent re-copying into a blue-sensitive relief material is admittedly possible but it involves further disadvantages which are known to the man skilled in the art and is very costly.

As extinction of the optical information emitted in a given viewing direction can be achieved due to the displacement of the structure of a sub-region relative to the structure of another sub-region by virtue of the additional diffraction phenomenon caused thereby, effective protection from copying can be achieved by virtue of the above-described configuration of the sub-regions. Thus, in a structure arrangement, a sub-region, for example half of a pixel, can involve such an optical depth that the diffraction efficiency for blue light is at a minimum, which means at the same time that the diffraction efficiency for red light is admittedly not at a maximum but is nonetheless considerable (for blue light of an HeCd-laser with ) R=442 nm the optical depth of a symmetrical rectangular or sinusoidal grating with minimum diffraction efficiency for that wavelength is precisely 442 nm; with that optical depth however there is a non-maximum but considerable level of diffraction efficiency for red light with a wavelength of about 600 nm). Another sub-region, for example the other half of the pixel, is of an optical depth in which red light involves for example maximum diffraction efficiency, that is to say for example 300 nm. With a suitable viewing direction, that sub-region or pixel can then be perceived in blue light as moderately light. The structure of the second sub-region can now be displaced relative to the structure of the first sub-region by such a fraction of the grating period (about $2\pi/3$) that the proportions of the incident light, which are diffracted away from the sub-regions, are substantially extinguished in red light. In that way for example dark script could be produced on a red background. When such a hologram is copied with a blue laser, and therefore only the specific blue wavelength of the laser is available, then the sub-region whose structure is of an optical depth which precisely corresponds to a wavelength in blue light is not copied as its diffraction efficiency in respect of blue light is at a minimum. Structures of such an optical depth cannot be 'seen' by the blue laser light and therefore also cannot be copied. The other sub-region which may have a particularly maximal diffraction efficiency for red light also however has a good level of diffraction efficiency for blue light, and for that reason the structure of those sub-regions can be satisfactorily copied. If the structure which is copied with blue light in that way is 'read out' with red light, the subtractive effect is missing in the red light and the pattern appears moderately red at that location. The above-mentioned script would then be difficult to read or could no longer be read, by virtue of the poor contrast under red light, whereby it is possible to make a distinction between a genuine structure and a duplicate.

To produce a homogeneous image impression it is proposed that sub-regions of the above-described kind are arranged in mutually adjoining relationship and in particular there is provided a plurality of sub-regions which can no longer be resolved with the naked eye.

It is pointed out that a structure arrangement according to the invention does not necessarily have to be in the form of a single-layer relief (lacquer relief) but can also be a multi-layer system. It would therefore be possible for a structure to be impressed into a multi-layer substrate comprising lacquer layers involving different refractive indices. In that respect different lacquers may also differ in terms of absorption, besides differing in regard to refractive index. That multi-layer system would result in further interference effects and could not be copied by a simple holographic procedure.

BRIEF DESCRIPTION OF THE DRAWINGS

Further details, features and advantages of the invention are apparent from the accompanying drawing and from the following description of preferred embodiments of the structure arrangement according to the invention. In the drawing.

DETAILED DESCRIPTION OF THE DRAWINGS

Figure 1:
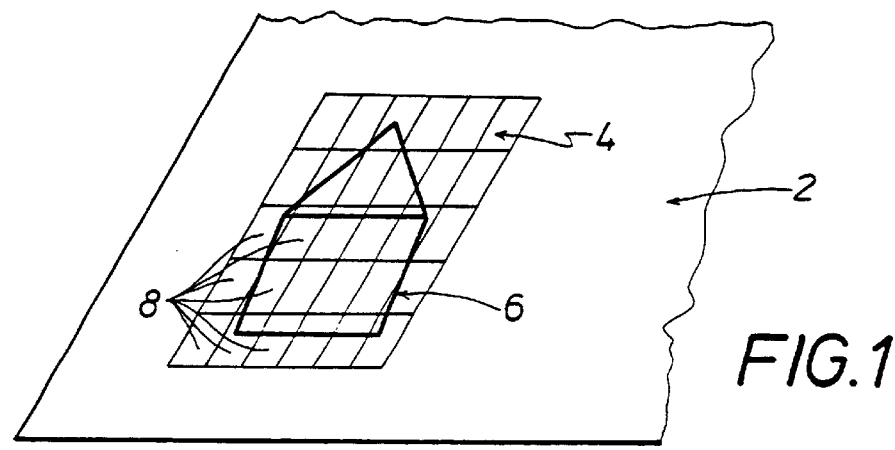
FIG. 1 shows a security element of a value-bearing document with a structure arrangement composed of a plurality of diagrammatically indicated surface regions.

FIG. 1 shows a value-bearing document carrier 2 with a security element 4. The security element 4 includes a structure arrangement in which an item of visually perceptible information is stored or encoded in the form of an image 6. The security element 4 or the structure arrangement comprises a multiplicity of diagrammatically indicated surface regions 8 which have one or more relief structures which cannot be shown in FIG. 1.

Figure 2:
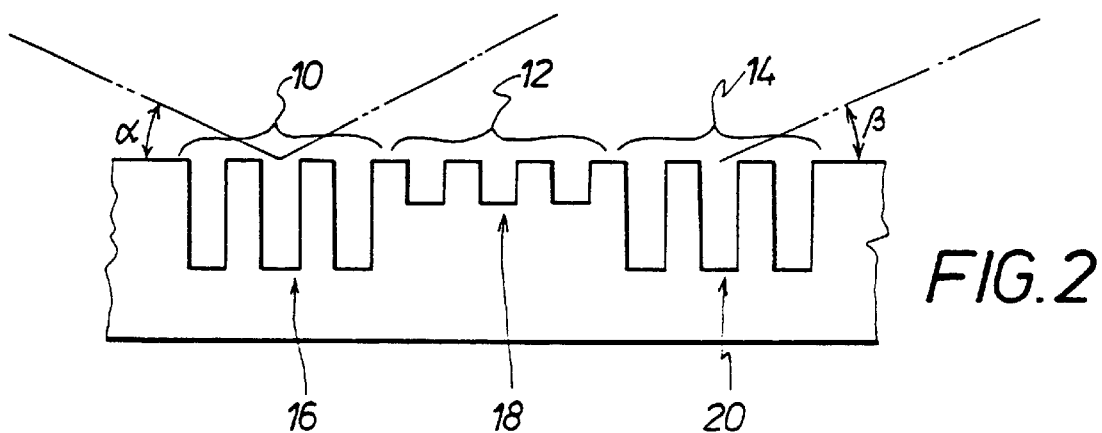
FIG. 2 is a diagrammatic sectional view of a structure arrangement according to the invention.

FIG. 2 shows a sectional view of a portion of a structure arrangement according to the invention. Of the structure arrangement, FIG. 2 shows sub-regions 10, 12, 14 which in particular can belong to the same surface region of the structure arrangement. The sub-regions 10, 12, 14 each include a respective rectangular relief structure 16, 18, 20. The relief structures 16, 18, 20 involve the same spatial frequency, the same mark-space ratio, and the same geometrical shape, they only differ in terms of geometrical depth. The relief structures 16, 18, 20 are also invariable over the extent of the respective sub-regions 10, 12, 14.

The depth of the respective relief structure 16, 18, 20 is associated for example with an image impression which is wanted in a given direction or a given color or a color impression. It can generally amount to a multiple of the wavelength. In accordance with the information set out in the opening part of this specification, in the to a quarter of the wavelength which is to be diffracted with the maximum efficiency (or also an odd multiple thereof) so that a phase difference of $\pi$ can be produced between the waves reflected by the raised portions and the troughs of the structure (if the structure is covered with a transparent cover layer the refractive index of that layer is also to be taken into consideration). In that way light incident in an incidence direction $\alpha$ can be perceived when viewed in a viewing direction $\beta$ in the form of a given color impression of the sub-regions 10, 14 or the identical relief structure 16, 20 thereof. In comparison, by virtue of suitably determining the optical depth the relief structure 18 of the sub-region 12 can be such that that sub-region communicates a different color impression. If, for the purposes of security checking, for example when detecting items of authenticity information by machine means, light of a given wavelength impinges at a given angle of incidence on to the security element or the structure arrangement thereof, then in a given viewing direction sub-regions of a given optical depth appear in the given color of the incident light while the diffraction efficiency of other sub-regions or relief structures is so slight in regard to that wavelength that those sub-regions appear dark.

Figure 3:
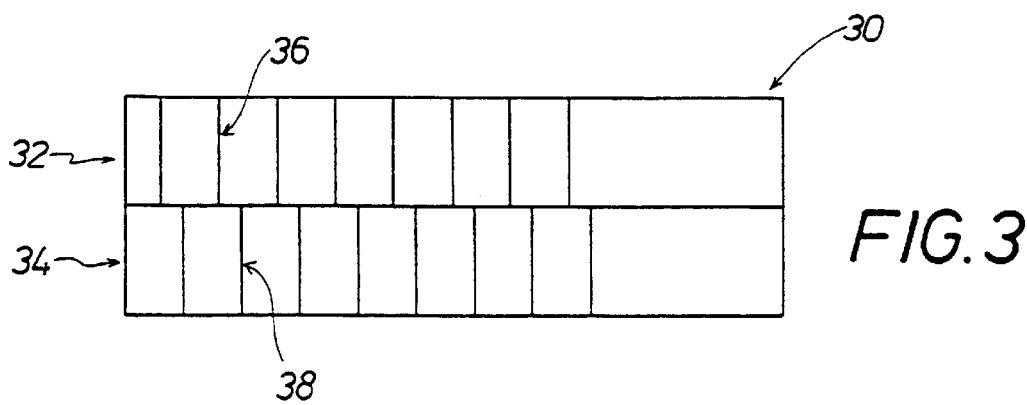
FIG. 3 shows two sub-regions of a structure arrangement according to the invention with mutually displaced relief structures.

It is now possible for individual surface regions to be formed with a relief structure that is identical except for the parameter of optical depth, in such a way that those relief structures are displaced relative to each other by a fraction of the grating period, which is diagrammatically shown in FIG. 3. Reference numeral 30 emphasizes a surface region of a structure arrangement, for example a pixel of a security element. The wavelengths which differ from each other. The relief structures 36, 38 are also arranged displaced relative to each other by a fraction of the grating period g in the carrier plane of the security element. When the surface region 30 is viewed addition of the wave fields which are emitted by the sub-regions 32, 34 occurs in the eye; that addition can be mathematically described as quantitative squaring of the amplitudes which are diffracted at the sub-regions 32, 34, with the relative value 1 or $\text{Exp}(i\phi)$, wherein the phase $\phi$ is given by $2\pi\delta x/g$. The intensity is therefore as follows:

$$I = (1 + \text{Exp}(i\phi)) \cdot (1 + \text{Exp}(-i\phi)) = 2 + 2\cos\phi.$$

Therefore the brightness of the surface region can additionally be adjusted by way of the relative displacement or shift of the relief structures 36, 38 relative to each other. It will be seen from the foregoing considerations that a phase shift of $\pi$ corresponds to a displacement of the gratings by half the grating period so that for example extinction of the first diffraction order can be achieved by virtue of the beam splitter function of the structure arrangement, which is achieved in that way.

What is claimed is:

1. A diffraction structure comprising a plurality of surface regions each having at least one structure having an optical-diffraction effect, wherein, among said plurality of surface regions, there is provided at least two surface regions for the production of given items of optical information in given viewing directions, each of said at least two surface regions having a grating structure that has a grating parameter of optical depth which is constant over the extent of the surface region of which it is a part, the grating structure of each of said at least two surface regions being identical to the grating structure of at least one other of said at least surface regions in every respect except that grating parameter of optical depth, and wherein said surface regions are immediately adjacent each other with parallel and non-collinear grating vectors and have their periods dephased relative to each other by a fraction of a grating period.

2. The structure as set forth in claim 1 wherein said optical depth of each of said grating structures is associated with a given visually perceptible light wavelength which serves to view the structure.

3. The structure as set forth in claim 2 wherein each of said grating structures of said surface regions is of an optical depth in the region between 0 and ten times the light wavelength which serves for viewing the structure.

4. The structure as set forth in claim 1 wherein said optical depth of each of said grating structures is associated with a given visually perceptible wavelength range which serves to view the structure.

5. The structure as set forth in claim 1 including a group of surface regions of identical structure.

6. The structure as set forth in claim 1 wherein said surface regions are arranged in mutually adjoining relationship.

7. The structure as set forth in claim 1 wherein said dephased grating structures are of such a nature as to blend continuously one into the other.

8. The structure as set forth in claim 1 which further includes a multi-layered relief system.

9. A diffraction structure comprising a plurality of surface regions each having at least one structure having an optical-diffraction effect, wherein, among said plurality of surface regions, there is provided at least two surface regions for the production of given items of optical information in given viewing directions, each of said at least two surface regions having a rectilinear grating structure that has a grating parameter of optical depth which is constant over the extent of the surface region of which it is a part, the grating structure of each of said at least two surface regions being identical to the grating structure of at least one other of said at least two surface regions in every respect except the grating parameter of optical depth, and said surface regions are immediately adjacent each other with parallel and non-collinear grating vectors and have their periods dephased relative to each other by a fraction of a grating period.

10. The structure as set forth in claim 9 wherein said optical depth of each of said grating structures is associated with a given visually perceptible light wavelength or wavelength range which serves to view the structure.

11. The structure as set forth in claim 9 wherein each of said grating structures of said surface regions is of an optical depth in the region between 0 and ten times the light wavelength which serves for viewing the structure.

12. The structure as set forth in claim 9 including a group of surface regions of identical structure.

13. The structure as set forth in claim 9 wherein said surface regions are arranged in mutually adjoining relationship.

14. The structure as set forth in claim 9 wherein said dephased grating structures are of such a nature as to blend continuously one into the other.

15. The structure as set forth in claim 9 which further includes a multi-layered relief system.

16. A diffraction structure used in combination with a machine for detecting light wavelength, said diffraction structure comprising a plurality of surface regions each having at least one structure having an optical-diffraction effect, wherein, among said plurality of surface regions, there is provided at least two surface regions for the production of given items of optical information in given viewing directions, each of said at least two surface regions having a grating structure that has a grating parameter of optical depth which is constant over the extent of the surface regions of which it is a part, the grating structure of each of said at least two surface regions being identical to the grating structure of at least one other of said at least two surface regions in every respect except the grating parameter of optical depth, and said surface regions are immediately adjacent each other with parallel and non-collinear grating vectors and have their periods dephased relative to each other within the plane of the surface regions by a fraction of a grating period, and wherein said optical depth of said respective grating structures are associated with a given machine-detectable light wavelength or wavelength range.

17. The structure as set forth in claim 16 wherein said respective grating structure of said surface regions is of an optical depth in the region between 0 and ten times the light wavelength which serves for viewing the structure.

* * * * *

UNITED STATES PATENT AND TRADEMARK OFFICE
CERTIFICATE OF CORRECTION

PATENT NO.     : 6,271,967 B1
DATED          : August 7, 2001
INVENTOR(S)    : Stork It is certified that error appears in the above-identified patent and that said Letters Patent is hereby corrected as shown below:

Column 4,
Line 46, now reads "of an HeCd-laser with ) R = 442 nm the optical depth of a" should read -- of an HeCd-laser with R = 442 nm the optical depth of a --

Column 6,
Line 6, now reads "the opening part of this specification, in the to a quarter of" should read -- the opening part of this specification, in the case of the rectangular relief structures illustrated here, it amounts to a quarter of --

Signed and Sealed this

Sixteenth Day of July, 2002

Attest:

Attesting Officer

JAMES E. ROGAN
Director of the United States Patent and Trademark Office